US012749018B2

(12) United States Patent
Burwinkel et al.

(10) Patent No.: US 12,749,018 B2
(45) Date of Patent: Sep. 29, 2026

(54) THEORY-MOTIVATED DOMAIN CONTROL FOR OPHTHALMOLOGICAL MACHINE-LEARNING-BASED PREDICTION METHOD

(71) Applicants: Carl Zeiss Meditec AG, Jena (DE); Technische Universität München, Munich (DE)

(72) Inventors: Hendrik Burwinkel, Munich (DE); Holger Matz, Unterschneidheim (DE); Stefan Saur, Aalen (DE); Christoph Hauger, Aalen (DE)

(73) Assignees: Carl Zeiss Meditec AG, Jena (DE); Technische Universität München, Munich (DE)

( * ) Notice: Subject to any disclaimer, the term of this patent is extended or adjusted under 35 U.S.C. 154(b) by 561 days.

(21) Appl. No.: 18/263,162

(22) PCT Filed: Jan. 26, 2022

(86) PCT No.: PCT/EP2022/051779
§ 371 (c)(1),
(2) Date: Jul. 27, 2023

(87) PCT Pub. No.: WO2022/162013
PCT Pub. Date: Aug. 4, 2022

(65) Prior Publication Data

US 2024/0120094 A1 Apr. 11, 2024

(30) Foreign Application Priority Data

Jan. 29, 2021 (DE) ..................... 10 2021 102 142.1

(51) Int. Cl.
*A61F 2/16* (2006.01)
*G06N 20/00* (2019.01)

(52) U.S. Cl.
CPC .................................... *G06N 20/00* (2019.01)

(58) Field of Classification Search
CPC .......... A61F 2/16; A61F 2/164; A61F 2/1643; A61F 2/1654; A61F 2002/1699;
(Continued)

(56) References Cited

U.S. PATENT DOCUMENTS 10,617,294 B1 * 4/2020 Krishna .................... G06T 7/90
12,419,511 B2 * 9/2025 Scales .................... G16H 20/40
(Continued)

FOREIGN PATENT DOCUMENTS

CN 122050770 A * 5/2026
DE 102006059829 A1 6/2008
(Continued)

OTHER PUBLICATIONS

International Search Report, Application No. PCT/JP2022/051779, mailed Apr. 19, 2022. ISA/European Patent Office.
(Continued)

*Primary Examiner* — Seema Mathew
(74) *Attorney, Agent, or Firm* — Honigman LLP; Brett A. Krueger

(57) ABSTRACT

A computer-implemented method for determining the refractive power of an intraocular lens includes providing a physical model for determining refractive power and training a machine learning system with clinical ophthalmological training data and associated desired results to form a learning model for determining the refractive power. A loss function for training includes: a first component taking into account clinical ophthalmological training data and associated and desired results and a second component taking into account limitations of the physical model wherein a loss function component value is greater the further a predicted value of the refractive power during the training is from
(Continued)

results of the physical model with the same clinical ophthalmological training data as input values. Moreover, the method includes providing ophthalmological data of a patient and predicting the refractive power of the intraocular lens to be used by means of the trained machine learning system.

17 Claims, 5 Drawing Sheets

(58) Field of Classification Search

CPC ...... A61F 2/1618; A61F 9/008; A61F 9/0026; A61F 2250/0002; A61F 2009/00863; A61F 9/007; A61F 9/00781; A61F 9/0008; A61F 2240/002; A61F 2240/001; A61F 2/1662; A61B 3/0025; A61B 3/16; G16H 50/20; G16H 30/20; G16H 50/50; G16H 20/40; G16H 50/70; G16H 10/60; G06T 2207/20081; G06T 2207/30041; G06T 2207/30052; G06N 20/00; G06N 3/08; G06N 3/096

See application file for complete search history.

(56) References Cited

U.S. PATENT DOCUMENTS 12,502,068 B2 * 12/2025 Scales ..................... A61B 3/107
12,507,885 B2 * 12/2025 Leung ....................... A61B 3/02
12,518,207 B2 * 1/2026 Burwinkel ................ A61F 2/16
2014/0276025 A1 * 9/2014 Durbin ................. A61B 3/0025 600/407
2019/0099262 A1 * 4/2019 Ladas .................. A61B 3/0025
2019/0110753 A1 * 4/2019 Zhang .................... G06N 3/084
2020/0015894 A1 * 1/2020 Bor ...................... A61B 3/0025
2020/0245858 A1 * 8/2020 Takeno ................ A61B 3/0025
2021/0059756 A1 * 3/2021 Kim ........................ G16H 40/67
2021/0106385 A1 * 4/2021 Bhattacharya ......... A61B 34/10
2021/0286996 A1 * 9/2021 Saur ....................... G16H 30/40
2022/0331092 A1 * 10/2022 Campin ................. A61B 3/107
2022/0331093 A1 * 10/2022 Matz .................... A61B 3/0025
2023/0057389 A1 * 2/2023 Burwinkel ................ A61F 2/16
2023/0084284 A1 * 3/2023 Burwinkel ............ G06T 7/0012 382/131
2023/0178237 A1 * 6/2023 Griffin ................... G16H 10/20 705/2
2023/0301600 A1 * 9/2023 Starynkevitch ...... A61B 5/7267
2024/0136066 A1 * 4/2024 Burwinkel ............. G16H 50/20
2024/0331127 A1 * 10/2024 Ma ........................ G01S 7/2921
2025/0221616 A1 * 7/2025 Lee ...................... A61B 3/0025
2025/0316359 A1 * 10/2025 Das ........................... A61F 2/16

FOREIGN PATENT DOCUMENTS

DE 102022128198 B4 * 8/2024 ............. G06N 20/00
DE 102023129782 A1 * 4/2025 ............. G16H 50/70
EP 3491996 A1 6/2019
EP 3675132 A1 * 7/2020 ............. G16H 40/20
WO WO-2021148515 A1 * 7/2021 ............. G06N 3/045
WO WO-2023057199 A1 * 4/2023 ............... A61B 5/36
WO WO-2024157850 A1 * 8/2024 ........... A61B 5/7275
WO WO-2024233555 A1 * 11/2024 ............. G06N 20/20

OTHER PUBLICATIONS

Hendrik Burwinkel et al. “Domain-specific loss design for unsupervised physical training: A new approach to modeling medical ML solutions” arxiv.org, Cornell University Library, 201 Olin Library Cornell Univeristy Ithaca, NY 14853, May 9, 2020 (May 9, 2020), DOI: 10.1007/978-3-030-59713-9_52 XP08199030.

* cited by examiner

THEORY-MOTIVATED DOMAIN CONTROL FOR OPHTHALMOLOGICAL MACHINE-LEARNING-BASED PREDICTION METHOD

CROSS-REFERENCE TO RELATED APPLICATIONS

This application is the U.S. national stage of PCT/EP2022/051779, filed on Jan. 26, 2022, which claims priority of German Patent Application DE 10 2021 102 142.1, filed on Jan. 29, 2021. The disclosures of these prior applications are considered part of the disclosure of this application and are hereby incorporated by reference in their entireties.

TECHNICAL FIELD

The disclosure relates to determining refractive power for an intraocular lens and, in particular, to a computer-implemented method for determining refractive power for an intraocular lens to be inserted, by means of a learning model with a specific loss function, to a corresponding system, and to a corresponding computer program product for carrying out the method.

BACKGROUND

Replacing the biological lens of an eye with an artificial intraocular lens (IOL)—for example, in the case of an (age-related) refractive error or in the case of cataracts—has become ever more common in the field of ophthalmology in recent years. In the process, the biological lens is detached from the capsular bag by way of a minimally invasive intervention and removed. The lens, which has become opacified in the case of a cataract, is then replaced by an artificial lens implant. In the process, this artificial lens implant or intraocular lens is inserted into the then empty capsular bag. Knowledge of the correct position of the intraocular lens and the necessary refractive power depend on one another.

In known, currently available IOL calculation formulas, use is made of physical models of differing complexity (e.g., the vergence principle in the known Haigis formula). In this way, it is possible to carry out a usable determination of IOL refractive power not only on the basis of data, but also with the aid of available physical knowledge. Despite a slightly improved accuracy, these formulas are always only approximations which are unable to reproduce the full complex reality of the biological eye. The use of ray tracing methods facilitates a further improvement in the accuracy of a model as many other, older models only work in paraxial approximation; however, approximations are also included in the system in this case, for example by way of the shape of the refractive interfaces. In relation to an availability of data, physical models can be finely adjusted or tuned with the aid of various parameters. However, the structure of said models and the choice of these parameters is specified by the respective developer, and therefore not necessarily the best possible representation. There can only be a very qualified optimal adaptation of the entire system in this form, and its flexibility is restricted by the chosen model.

Proceeding from the disadvantages of the known methods for approximately determining a correct refractive power for an IOL to be inserted, an underlying object of the concept presented herein is that of specifying a method and a system for improved IOL refractive power predictions for an intraocular lens.

SUMMARY

This object is achieved by means of the method proposed here, the corresponding system and the associated computer program product in accordance with the independent claims. Further embodiments are described by the respective dependent claims.

According to one aspect of the present disclosure, a computer-implemented method for determining refractive power for an intraocular lens to be inserted is presented. In this case, the method can comprise in particular providing a physical model for determining refractive power for an intraocular lens and training a machine learning system with clinical ophthalmological training data and associated desired results to form a learning model for determining the refractive power. In this case, a loss function used for the training can comprise two components: a first component of the loss function can take into account corresponding items of the clinical ophthalmological training data and associated and desired results, and a second component of the loss function can take into account limitations of the physical model in that a loss function component value of this second component becomes all the greater, the further a predicted value of the refractive power during the training deviates from results of the physical model with the same clinical ophthalmological training data as input values.

The method can furthermore comprise providing ophthalmological data of a patient and predicting the refractive power of the intraocular lens to be inserted by means of the trained machine learning system, wherein the provided ophthalmological data can be used as input data for the machine learning system.

According to another aspect of the present disclosure, a system for determining refractive power for an intraocular lens to be inserted is presented. The system can comprise in particular a providing module, in which a physical model for determining refractive power for an intraocular lens is stored, and a training module adapted for training a machine learning system with clinical ophthalmological training data and associated desired results to form a learning model for determining the refractive power. In this case, parameter values of the learning model can be stored in the learning system. A loss function used for the training can comprise in particular two components: a first component of the loss function can take into account corresponding items of the clinical ophthalmological training data and associated and desired results, and a second component of the loss function can take into account limitations of the physical model in that a loss function component value of this second component becomes all the greater, the further a predicted value of the refractive power during the training deviates from results of the physical model with the same clinical ophthalmological training data as input values.

Moreover, the system can comprise a memory for ophthalmological data of a patient and a prediction unit adapted for predicting the refractive power of the intraocular lens to be inserted by means of the trained machine learning system, wherein the provided ophthalmological data are used as input data for the machine learning system.

Furthermore, embodiments can relate to a computer program product able to be accessed from a computer-usable or computer-readable medium that comprises program code for use by, or in conjunction with, a computer or other instruction processing systems. In the context of this description, a computer-usable or computer-readable medium can be any device that is suitable for storing, communicating, transferring, or transporting the program code.

The computer-implemented method for determining refractive power for an intraocular lens to be inserted has a plurality of advantages and technical effects which may also apply accordingly to the associated system: A machine learning system for determining refractive power for an intraocular lens to be inserted which is only based on available clinical ophthalmological data firstly would require a comparatively long training time, and secondly known properties of physical models could not be taken into account as elegantly. Moreover, if clinical training data were exclusively used, very many data points—i.e. training data—would be required in order to guarantee a high number of anatomical variability. Moreover, there would be no active control over what variability actually exists for the purely clinical—i.e. ophthalmological—training data. The entire parameter space can be systematically sampled by physical models.

The method presented here, by contrast, uses the best from both worlds: firstly the world of physical-mathematical models but secondly also the world of clinical ophthalmological data. Furthermore, the machine learning model can additionally be pretrained before the training with clinical ophthalmological data. For this purpose, automatically generated training data can be generated by means of a physical model. This physical model need not necessarily be the same one which influences the loss function. In this way, influences of different physical models could be taken into account during the training.

In this case, the method presented has a crucial influence on the robustness of the training, both for the untrained case and for the case of a pretrained system. In the case of an untrained neural network, the physical constraint in the loss function ensures that the system cannot learn physically inconsistent predictions while it is being trained on the real data. Consequently, the influence of outliers in the data set is averted and the trained network in its entirety can yield a stabler prediction. In the case where the machine learning model has already been pretrained on artificial data with the aid of the physical constraint and thus contains physical knowledge, the control over the loss function can have the effect that no "catastrophic forgetting" can begin, that is to say that the previously learned knowledge cannot simply be overwritten by the training on the ophthalmological data. The physical constraint in the loss function can force the network to continue to take into account the physical boundary conditions and limits.

Owing to this constraint and the additional physical information which can be made available during the training, overall significantly fewer data may be required for the training since the physical boundary conditions do not have to be learned from the data. This can enable a distinctly more flexible and more rapid application of the method since large amounts of data (i.e. clinical training data) do not have to be collected beforehand. Furthermore, it is possible to train on clinic-specific data sets in order thus to be able to accurately coordinate the method and the corresponding system with these data sets. This is made possible since only comparatively few items of clinical data become necessary for the training.

The physical constraint in the loss function itself can represent coverage of the entire parameter space. It can yield the correct physical solution for any conceivable data point and can thus make it possible to systematically represent the entire parameter range. Compared with the traditional method, this is a crucial advantage for a training process since, under normal circumstances, the real data present can represent only a small part of the parameter space. The latter can moreover always be error-prone. All this can be compensated for by the physical constraint. It thus constitutes a crucial extension and improvement of the training process.

Since the real data always have to be taken into account as well besides this direct training with the aid of the physical model, the correct weighting of the components with respect to one another can constitute a further crucial aspect of the concept presented. What can be achieved by means of the weighting performed is that the machine learning model firstly can take into account the physical boundary conditions, and secondly has enough freedom to adapt itself to the ideal data situation. This balanced interplay can afford a crucial advantage in the training process and improve the final prediction of the IOL refractive power for new ophthalmological data.

In addition, it would also be possible to take theoretical ophthalmological data into account. These data can consist of literature data. Interpolations between the literature data—or data from other sources—can also generate intermediate values. These additional reference data obtained in this way could supplement or replace the mathematical-physical model besides or instead of the physical model in the loss function.

In this way, there is great latitude with regard to taking account of mathematical-physical models during the training of the machine learning system trained with the clinical ophthalmological data. On the other hand, there also arises a large source pool of additional data which are not used in the currently used physical model influencing the loss function.

The concept proposed could also be extended to the effect that not just one physical model would be used in the influencing of the loss function. Rather, the influencing of the loss function could also take account of at least one further physical model. In such a case, the loss function would be supplemented by a further term, which would be included with an additional weight factor. The rest of the function—in particular the supply of the input data—would be effected in accord and in parallel with the first physical model.

Overall, a speed advantage can be achieved in the training, which advantage can arise by virtue of the fact that during the training this does not just involve training by means of the clinical ophthalmological data, but also measurement outliers in the clinical ophthalmological data are directly corrected by the physical model. The training phase for the machine learning system could also proceed with fewer, or less well, annotated data. Overall, there could be a significant saving of computing power, and the available computer capacities could thus be better utilized.

Further exemplary embodiments are presented below, which can have validity both in association with the method and in association with the corresponding system.

In summary, it can thus be stated that in contrast to known machine learning systems and corresponding methods for determining the IOL refractive power, which operate on the basis of real data—i.e. on the basis of ophthalmological data—during training and thus need a large amount of training data and do not allow a possibility of solid predictions (i.e. IOL refractive power determinations) outside their parameter space covered by the training data set, the method and system presented here can use the boundary conditions of physical models and of clinical ophthalmological training data equally and in a correspondingly weighted manner. The concept presented here can thus go beyond the traditional methods in which the number of clinical training data typically available are insufficient for covering the totality of the physical boundary conditions. Moreover, these may also be prone to measurement errors, which makes the situation even more difficult. Briefly: (i) The entire expected anatomical variability can be covered by the physical model, thus giving rise to more robust systems for determining or predicting the IOL refractive power. Additionally (ii) the combination of the physical model with the clinical data means that fewer clinical data are required for a robust model. Robust clinic-specific, physician-specific or lens-specific models can thus be created.

In accordance with one advantageous embodiment of the method, the first and second components of the loss function can be weighted in a configurable manner. Fine tuning of the learning model of the machine learning system to be trained is thus possible. In this regard, for example, which of the two components of the loss function should be accorded more weight is configurable: (i) the clinical ophthalmological training data or (ii) the limitations resulting from the physical model. In this way, the influencing parameters can be adjusted quite individually, and also depending on the chosen type of physical model. In this way, weights of different strengths, depending on the type of physical model chosen, or else other or additional limitations ("constraints") could be defined. A motivation for introducing the weighting is thus directly recognizable, namely establishing a balance between catastrophic interference that may stem from the physical model, and the risk as a result of over-fitting on the basis of the clinical data.

In accordance with a further advantageous embodiment of the method, a weighting function of the following type can be applied:

$$W_L = B*[a*(\text{Delta})-(1-a)*Phy],$$ wherein the following applies:

- $W_L$=value of the loss function,
- B=general constant or further function term of the loss function,
- a=weighting constant,
- Delta=first components, i.e. results of an error function (e.g. MSE, mean square error) of the error values during training; and
- Phy=second component, i.e. the limitation resulting from the physical model.

The values for the weighting can be set anew from training to training (or retraining). An explicit user interface can be present for this purpose in order to enable training under optimum conditions. This would allow different physical boundary conditions—i.e. physical models—also to be tried out elegantly.

In accordance with a supplementary advantageous embodiment of the method, the ophthalmological data can comprise OCT image data—i.e. complete "raw" image data—or explicit ophthalmological values derived from OCT image data, or both OCT image data and values derived from the OCT image data. Furthermore, it is entirely possible for the image data also to be biometric data. In this way, there is great flexibility in the use of the training data to be used.

In accordance with a further developed embodiment of the method, an expected position of the intraocular lens to be inserted can be used as additional input data value for the machine learning system during productive operation. It can be expected that an additional improvement in the determination of the refractive power of the IOL will become possible in this way.

In accordance with an extended form of one embodiment of the method, the learning model of the machine learning system, before the training with ophthalmological data, can already have been trained by artificially generated training data based on laws of the physical model provided. The laws can be represented by a physical model—i.e. formulae. In this case, it is also possible for the physical model for the pretraining mentioned here to differ from the physical model during the main training mentioned further above. In this way, at least two different physical models could be taken into account: (i) one physical model during the pretraining of the 2-stage training implemented in this way for the learning model of the machine learning system and (ii) a second physical model during the subsequent main training of the learning model of the machine learning system. Depending on the physical models thus chosen, the above-mentioned weighting of the loss function could easily be set by way of the specifically adapted user interface. Taking account of two different physical models in this manner means that the loss function would not have to be supplemented by a further term. Moreover, the training time and/or the amount of real training data can thus be reduced. Available resources would be better used.

Consequently, the learning model to be trained would thereby profit in terms of time from the pretraining using physical models. In theory, ever finer physical models could be used for the training or for the generation of training data.

In accordance with an extended form of one embodiment of the method, the physical model can also comprise literature data for determining refractive power for the intraocular lens. The literature data can be present in tabular form, from which value tuples could be provided—e.g. also by interpolation of the values present—as supplementation or replacement for the physical model. In this way, the physical model could be dispensed with, but without having to dispense with the influence of known limit values ("constraints").

In accordance with a well usable embodiment of the method, the intraocular lens to be inserted can be a spherical, toric or multifocal intraocular lens to be inserted—or further lens shapes. The concept presented here would thus be comprehensively usable. Advantageously, the training data and the physical model (or the physical models) would also be selected accordingly.

According to a further exemplary embodiment of the method, the machine learning system can be a neural network. A convolutional neural network (CNN) can be involved in this case. CNNs prove to be particularly helpful when the task is to process image data to be classified, such as the raw data of the ophthalmological data may be.

Alternatively, use could also be made of possibly present time-dependent data from 4-D scans of the eye (three spatial directions and changes of the scan data of the eye over time). In this case, use could be made of an RNN (recurrent neural network), either as a replacement for the aforementioned CNN or in addition thereto.

According to one advantageous exemplary embodiment of the method, the ophthalmological data of an eye may include at least one datum from the group consisting of an axial length, an anterior chamber depth, a lens thickness, a posterior chamber depth, a corneal thickness, a corneal keratometry, a lens equatorial plane, a white-to-white distance and a pupil size. It is understood that respective numerical values of the aforementioned parameters are intended. Currently, these eye parameter values can be determined elegantly and with great accuracy by way of an eye scan.

According to an extended exemplary embodiment of the method, the second physical model can be representable as a mathematical model or a ray tracing model. Consequently, the option of using different methods to make available improved model-based training data also arises in the second stage of generating training data. This can increase the leeway when individualizing the proposed method for certain uses.

According to a further extended exemplary embodiment of the method, the clinical ophthalmological training data can be determined or generated manually or by means of a third machine learning system. In this context, manually would mean measured by means of an eye scan apparatus. In contrast thereto, training data generated by means of a third machine learning system would tend to have more of an artificial nature, with it however also being possible to use a comparatively small amount of clinical ophthalmological data in order to provide a greater amount of training data for the final learning step by means of the third, already trained machine learning system. In this way, the method presented here would also be usable with a comparatively small amount of clinical ophthalmological data, which would normally not be sufficient to be refined by means of the two-stage training step from the physical model(s) to true clinical data. By way of example, a GAN (generative adversarial network) could be used for this purpose.

BRIEF DESCRIPTION OF THE DRAWINGS

It should be pointed out that exemplary embodiments of the disclosure may be described with reference to different implementation categories. In particular, some exemplary embodiments are described with reference to a method, whereas other exemplary embodiments may be described in the context of corresponding devices. Regardless of this, it is possible for a person skilled in the art to identify and to combine possible combinations of the features of the method and also possible combinations of features with the corresponding system from the description above and below—if not specified otherwise—even if these belong to different claim categories.

Aspects already described above and additional aspects of the present disclosure become apparent inter alia from the exemplary embodiments that are described and from the additional further specific embodiments described with reference to the figures.

Figure 1:
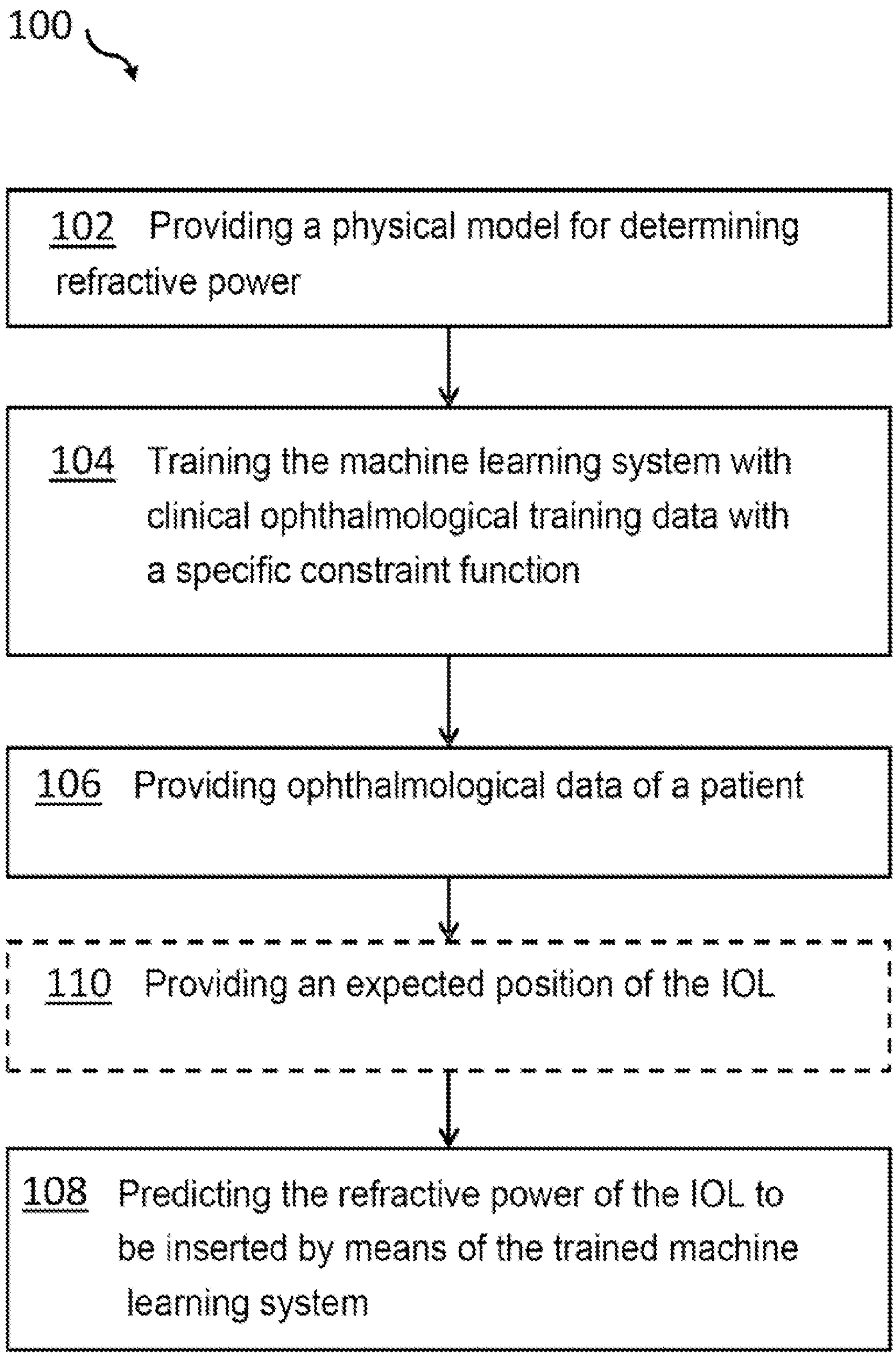

Preferred exemplary embodiments of the present disclosure are described by way of example and with reference to the following figures:

FIG. 1 illustrates a flowchart-like representation of an exemplary embodiment of the computer-implemented method for determining refractive power for an intraocular lens to be inserted.

Figure 2:
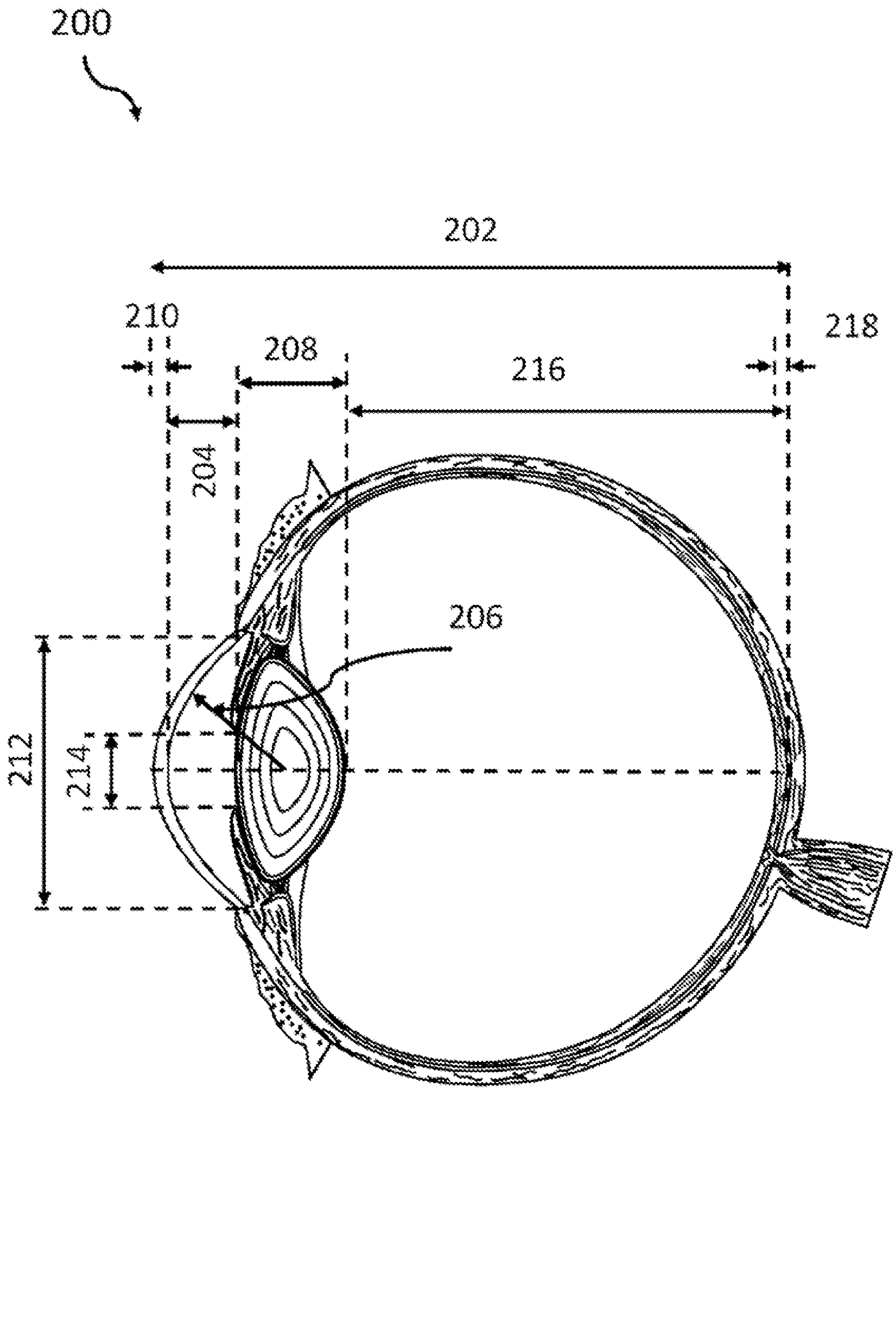

FIG. 2 illustrates an eye together with different biometric parameters of the eye.

Figure 3:
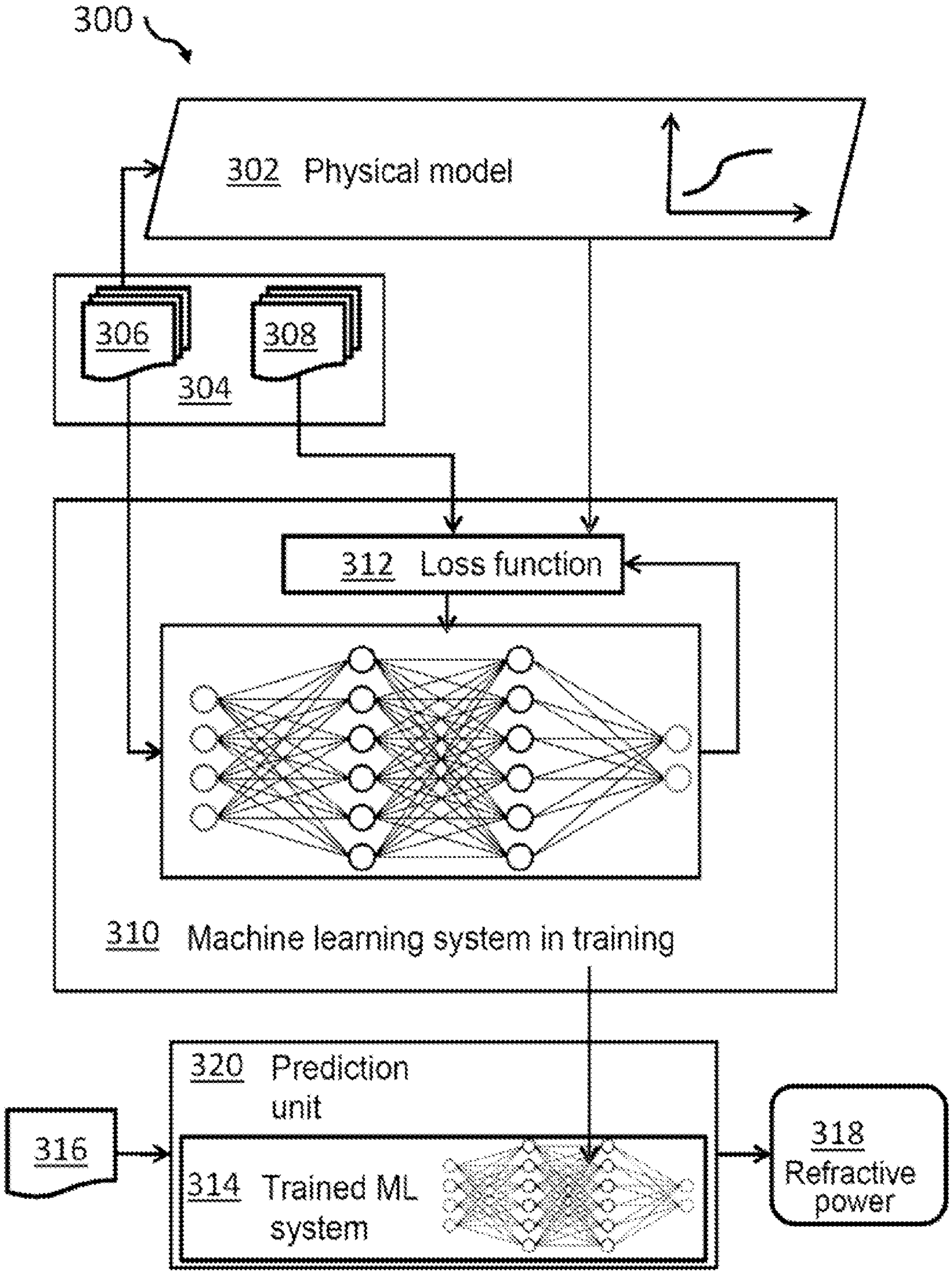

FIG. 3 depicts a schematic structure of essential functional components of the underlying proposed method or the associated system.

Figure 4:
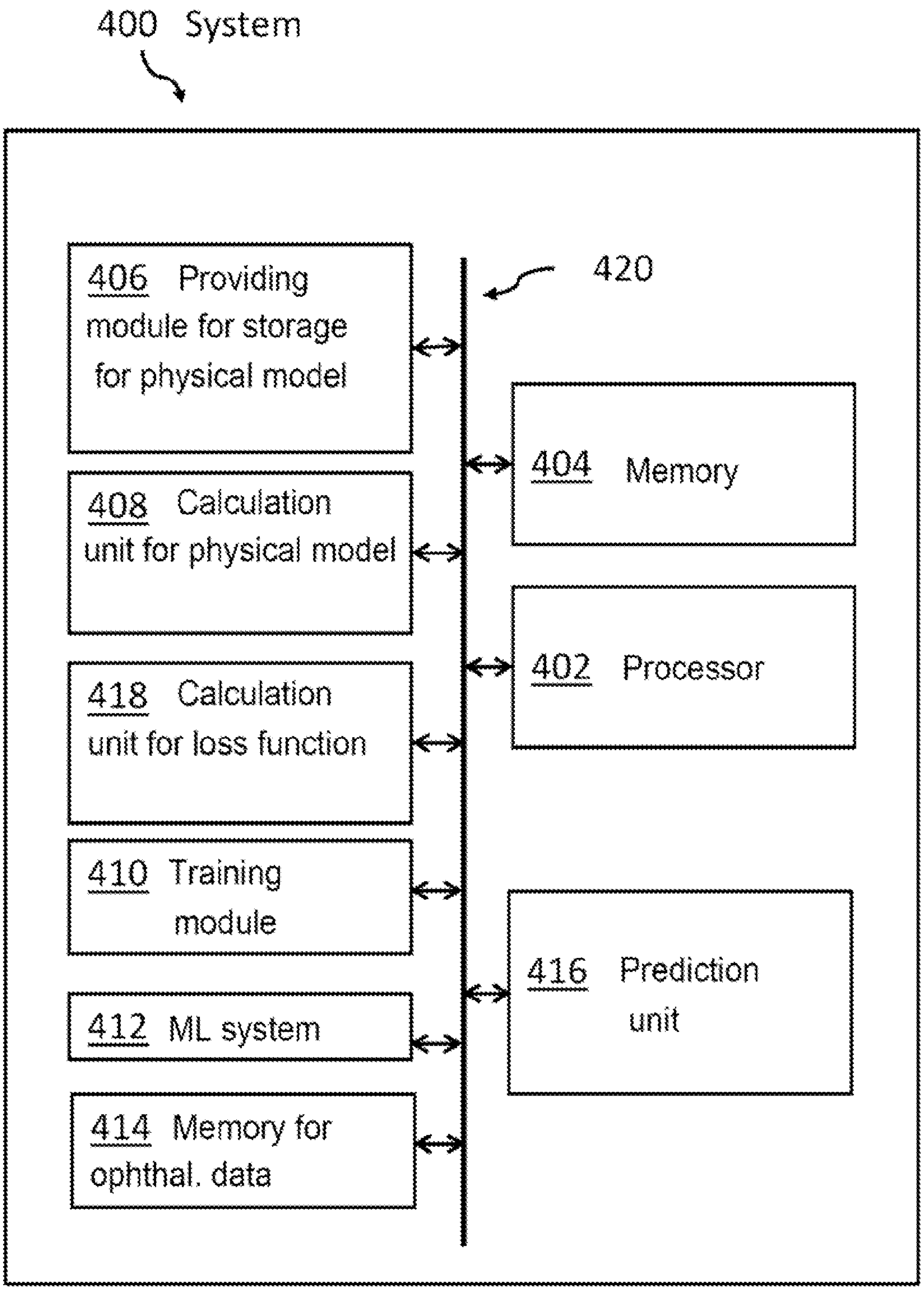

FIG. 4 illustrates a diagram of the prediction system according to the disclosure.

Figure 5:
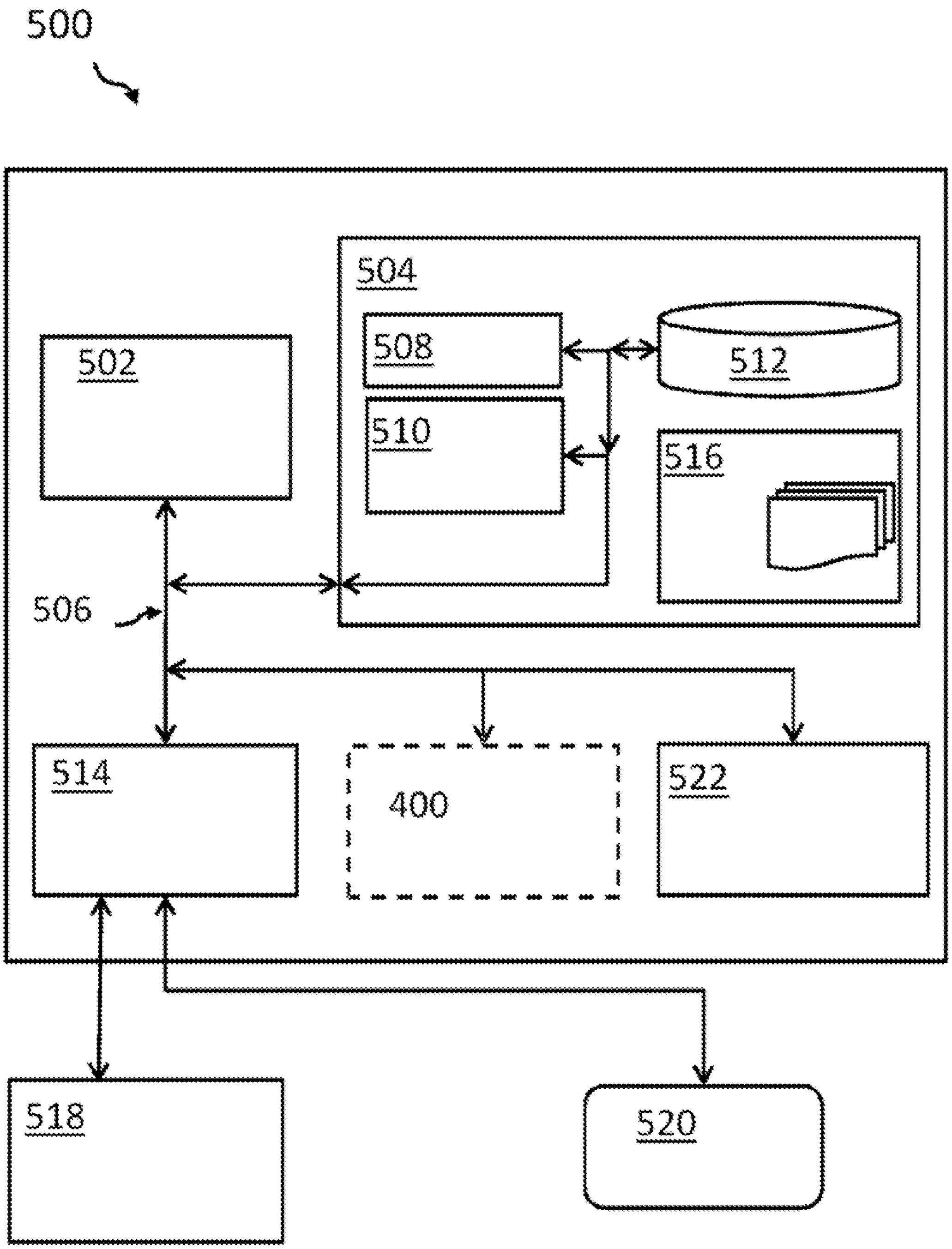

FIG. 5 depicts a diagram of a computer system which may additionally comprise the system according to FIG. 4 in full or in part.

DETAILED DESCRIPTION OF EMBODIMENTS

In the context of this description, conventions, terms and/or expressions should be understood as follows:

The term "intraocular lens" describes an artificial lens which can be inserted into the eye of a patient by surgery to replace the natural, biological lens.

The term "loss function" describes an error function which outputs a value or a set of error values, during the training of a machine learning system, which is normally all the greater, the further apart from one another the predicted value and the expected value of the machine learning system are for a set of associated input values. A number of methods are possible for determining and using this difference (e.g. MSE=mean square error or cross-entropy). The output value (s) of the loss function is/are fed (backpropagation) into the neural network—or to the nodes or the weight functions. In this way, actually predicted output values of the machine learning system converge in the direction of the annotated—i.e. desired—result values.

The term "machine learning system" describes a system that is also typically assigned to a method, said system learning from examples. To this end, annotated training data (i.e. also containing metadata) are fed to the machine learning system in order to predict output values—output classes in the case of a classification system—that were already set in advance. If the output classes are correctly output with sufficient precision—i.e., an error rate determined in advance—the machine learning system is referred to as trained. Various machine learning systems are known. These include neural networks, convolutional neural networks (CNN) or else recurrent neural networks (RNN).

In principle, the term "machine learning" is a basic term or a basic function from the field of artificial intelligence, wherein statistical methods, for example, are used to give computer systems the ability to "learn". By way of example, certain behavioral patterns within a specific task range are optimized in this case. The methods that are used give trained machine learning systems the ability to analyze data without requiring explicit procedural programming for this purpose. Typically, an NN (neural network) or CNN (convolutional neural network), for example, are examples of systems for machine learning, for forming a network of nodes which act as artificial neurons, and artificial connections between the artificial neurons (so-called links), wherein parameters (e.g., weighting parameters for the links) can be assigned to the artificial links. When training the neural network, the weighting parameter values of the links adjust automatically on the basis of input signals so as to generate a desired result. In the case of supervised learning, the images supplied as input values (training data)—generally (input) data—are supplemented with desired output data (annotations) in order to generate a desired output value (desired class). Considered very generally, mapping of input data onto output data is learned.

The term "neural network" describes a network made of electronically realized nodes with one or more inputs and one or more outputs for carrying out calculation operations (activation functions). Here, selected nodes are interconnected by means of connections—so-called links or edges. The connections can have certain attributes, for example weighting parameter values, by means of which output values of preceding nodes can be influenced.

Neural networks are typically constructed in a plurality of layers. At least an input layer, a hidden layer, and an output layer are present. In a simple example, image data can be supplied to the input layer and the output layer can have classification results in respect of the image data. However, typical neural networks have a large number of hidden layers. The way in which the nodes are connected by links depends on the type of the respective neural network. In the present example, the predicted value of the neural learning system can be the sought-after refractive power of the intraocular lens.

The term "recurrent neural network" denotes neural networks which, in contrast to the feedforward networks, are distinguished by links of neurons (i.e. nodes) of one layer to neurons of the same or a preceding layer. This is the preferred manner of interconnection of neural networks in the brain, in particular in the neocortex. In artificial neural networks, recurrent interconnections of model neurons are frequently used to discover time-encoded—i.e. dynamic—information in the data. Examples of such recurrent neural networks include the Elman network, the Jordan network, the Hopfield network and the fully connected neural network. They are also suitable for examining a dynamic behavior in recordings of eyes, in particular for taking account of the accommodation behavior of the eye.

The term "convolutional neural network" (CNN)—as one example of a classifier/classifier system—describes a class of artificial neural networks that are based on feedforward techniques. They are often used for image analyses using images, or the pixels thereof, as input data. The main components of convolutional neural networks are in this case convolution layers (hence the name) that allow efficient evaluation through parameter sharing. In contrast to the CNN, each pixel of the recorded image would typically be associated with an artificial neuron of the neural network as an input value in a conventional neural network.

The term "parameter value" describes geometric or biometric values, or ophthalmological data of an eye of a patient. Examples of parameter values of an eye are discussed in more detail on the basis of FIG. 2.

The term "scan result" describes digital data, for example on the basis of digital images/recordings, which represent the result of an OCT (optical coherence tomography) examination on an eye of a patient.

The term "optical coherence tomography" (abbreviated to OCT) describes a known imaging method of ophthalmology, for obtaining two- and three-dimensional recordings (2-D or 3-D) of scattering materials (e.g. biological tissue) with micrometer resolution. In the process, use is essentially made of a light source, a beam splitter and a sensor—for example in the form of a digital image sensor. In ophthalmology, OCT is used to detect spatial differences in the reflection behavior of individual retinal layers, and morphological structures can be represented with a high resolution.

The term "A-scan" (also referred to as axial depth scan) describes a one-dimensional result of a scan of a patient's eye, which provides information about geometric dimensions and locations of structures within the eye.

The term "B-scan" describes a lateral overlay of a plurality of the aforementioned A-scans, to obtain a section through the eye. Volume views are also generable by combining a plurality of layers of the eye generated thus.

The term "en face OCT" in this case describes a method for producing transverse sectional images of the eye—in contrast to longitudinal sectional images using the aforementioned A- or B-scans.

The term "dynamic eye data" describes a sequence of 2-D sectional images of the eye—usually in the same position—in order to recognize dynamic changes, that is to say changes over time—for example the adaptability of the eye.

The term "digital image"—e.g. from a scan—in this case describes an image representation of, or the result of generating an amount of data in the form of pixel data from, a physically existing article: by way of example, a retina of an eye in this case. More generally, a "digital image" can be understood to be a two-dimensional signal matrix. The individual vectors of the matrix can be adjoined to one another in order thus to generate an input vector for a layer of a CNN. The digital images can also be individual frames of video sequences.

The term "clinical ophthalmological training data" describes data about patients' eyes and intraocular lenses already inserted into these patients in the past. The clinical ophthalmological training data may include determined ophthalmological parameter values, such as also the refractive power and the position of the inserted lens. These data are used for the purposes of training the machine learning system which has already been trained previously on the basis of data from a physical model. As a rule, the clinical ophthalmological training data are annotated.

The term "training data" describes data that can be used to train the machine learning system. These training data for the machine learning system are ophthalmological data and associated refractive power values from past successful lens exchange operations.

The term "physical model" relates to a mathematical formula which relates various parameters of an eye to one another in order to undertake determinations of refractive power. Known formulae include the Haigis formula and the Universal Barrett II formula. Moreover, a ray tracing method could be used.

The term "refractive power of an intraocular lens" describes the index of refraction of the IOL.

A detailed description of the figures is given below. It is understood in this case that all of the details and information in the figures are illustrated schematically. What is illustrated first of all is a block diagram of one exemplary embodiment of the computer-implemented method according to the disclosure for determining the refractive power for an intraocular lens to be inserted. Further exemplary embodiments, or exemplary embodiments for the corresponding system, are described below:

FIG. 1 illustrates a flowchart-like representation of an exemplary embodiment of the computer-implemented method 100 according to the disclosure. The method 100 comprises providing 102 a physical model for determining refractive power for an intraocular lens. This can involve a formula for determining a refractive power on the basis of a series of input parameters, data from some other trained machine learning system, or literature data, e.g. stored in tabular form.

Furthermore, the method 100 comprises training 104 a machine learning system with clinical ophthalmological training data and associated desired results to form a learning model for determining the refractive power, wherein a loss function for the training comprises two components. The desired results are results of the machine learning system that are to be predicted given the presence of specific input parameter values. The combination of input data and expected result data is also referred to as "ground truth" in the context of machine learning. This applies in particular to so-called "supervised learning", which is performed here.

A first component of the loss function takes into account the corresponding items of the clinical ophthalmological training data and associated, desired results. This component of the loss function can use the known mean square error method. In this case, the component of the loss function becomes greater (quadratically), the further the predicted value deviates from the annotated associated result (prediction) value. The use of the square ensures that both numerically positive values and numerically negative error values are taken into account in the same way.

The second component of the loss function takes into account limitations of the physical model in that a loss function component value of this second component becomes all the greater, the further a predicted value of the refractive power by means of the machine learning system during the training deviates from results of the physical model with the same clinical ophthalmological training data as input values for the physical model.

The method 100 furthermore comprises providing 106 determined ophthalmological data of a patient and predicting 108 the refractive power of the intraocular lens to be inserted by means of the trained machine learning system, wherein the provided ophthalmological data are used as input data for the machine learning system.

Optionally (therefore shown using dashed lines), a position of the intraocular lens to be inserted can also be used as an additional input value for the machine learning system (cf. 110).

FIG. 2 depicts an eye 200 with various biometric or ophthalmological parameters of an eye. In particular, the following parameters are represented: axial length 202 (AL), anterior chamber depth 204 (ACD), keratometry value 206 (K, radius), refractive power of the lens (power), lens thickness 208 (LT), central cornea thickness 210 (CCT), white-to-white distance 212 (WTW), pupil size 214 (PS), posterior chamber depth 216 (PCD), retina thickness 218 (RT). At least one of these parameters is contained both in the ophthalmological training data and in the ophthalmological data of a patient, which are each contained in the subject matter of the concept presented here.

FIG. 3 represents a schematic structure 300 of essential functional blocks, which are useful for the implementation of the proposed method. Initially, a suitable physical model 302 of an eye for determining refractive power is selected and provided. Secondly, training data 304 are made available for the machine learning system 310. These are firstly so-called ground truth data, i.e. result values for the prediction of the refractive power values 308, and (annotated) measured ophthalmological data 306. Alternatively, instead of the measured ophthalmological data, the complete image data of the corresponding eye can also additionally or alternatively be used (for example A-scan, B-scan, etc.).

At the same time, the input values of the training data (measured ophthalmological data 306) are provided to a calculation module for result values for the physical model. The latter determines, in parallel with the desired or annotated IOL refractive power values, the deviation of the output of the machine learning system 310 (will be described in more specific detail in the next paragraph) from the physically correct solution and returns a value that becomes all the greater, the further the output from the machine learning system 310 deviates from this solution. Other sources, such as literature values, for example, can also be used instead of the calculated or otherwise determined output of the physical model 302.

The machine learning system 310 in training is illustrated as a deep neural network (DNN). The latter has an input layer of nodes (left) and an output layer (right) of nodes. Although only four and two nodes, respectively, are illustrated, the number of input nodes and output nodes would typically be significantly higher in the case of a neural network that can be used in reality. Between the input layer and the output layer there are a plurality of further layers with nodes (typically more than the 2 inner layers of the DNN illustrated by way of example), which are selectively interconnected via respective weight functions.

The training of the machine learning system or the learning model thereof involves iteratively determining the parameters for the nodes or the corresponding weight functions of the connections between the nodes. The loss function 312 determines what values are adopted by the weight functions or parameter values of the nodes during the training. Put simply, the training is continued until a deviation between the desired IOL refractive power and the IOL refractive power predicted by the machine learning system falls below a predefined minimum value.

However, the special feature of the method proposed here now resides in the fact that the value of the loss function 312 is not just based on the difference described above, but rather has a second—typically additive, e.g. additionally linear—component determined by the results of the calculation module for the underlying physical model 302. The weighting of the components of the loss function 312 enables fine tuning during the training of the machine learning system 310 in an elegant and advantageous manner.

In order to ensure synchronous availability of the two components of the loss function, a synchronization unit is advantageously available, which controls the supply of further training data to the effect that new training data are made available only if both components of the loss function were previously available for a backpropagation cycle step and the training step was thus able to be fully completed.

Once the training of the machine learning system 310 has finished, this system can be used productively. The machine learning system 314 then trained can now receive ophthalmological data 316 of a patient and, by way of its trained machine learning model, predict the refractive power 318 by means of the prediction unit 320 for an intraocular lens to be inserted. In this case, the desired position of the intraocular lens to be inserted can additionally be used as additional input parameter value for the trained machine learning system 314. Moreover, either instead of or in addition to the ophthalmological data 316, determined image data of the patient's eye can be used as input values for the trained machine learning system 314.

FIG. 4 illustrates—for the sake of completeness—a preferred exemplary embodiment of components of the system 400 for determining refractive power, which assist the training of the machine learning system of the proposed method 100 and which are also used in the operative phase of the method.

The system 400 comprises a processor 402, which can execute program modules or program code stored in the memory 404. As a result, the processor influences the function of the following components in such a way that the elements of the method can be implemented. In particular, the system 400 comprises for this purpose a providing module 406 for storage for the physical model. In this case, for example, literature values for combinations of measured ophthalmological data and associated IOL refractive power values can also be stored, or the model can be stored in the form of a physical formula with corresponding parameters. A calculation unit 408 for the physical model, which makes use of the memory of the providing module 406 for the physical model, can furthermore be present.

Supplementarily, a calculation unit 418 for the loss function, which takes account of the two components described above, can also be present.

The training module 410 adapted for training a machine learning system with clinical ophthalmological training data and associated desired results to form a learning model for determining the refractive power of the IOL uses the results of the loss function during the training. In this case, the loss function comprises the following components: (i) a first component, which takes into account corresponding items of the clinical ophthalmological training data and associated and desired results, and (ii) a second component, which takes into account limitations of the physical model in that an associated loss function component value of this second component becomes all the greater, the further a predicted value of the refractive power during the training deviates from results of the physical model—or any other boundary conditions ("constraints")— with the same clinical ophthalmological training data as input values. For this purpose, besides linear approaches, e.g. a polynomial or exponential function can also be used.

Via the memory 414, the ophthalmological data of a patient are finally provided to the machine learning system 412 (which corresponds to the machine learning system 310 from FIG. 3). The prediction unit 416 (cf. FIG. 3, 320) outputs the prediction data determined by the machine learning system 412 for the refractive power of the intraocular lens to be inserted, wherein the provided ophthalmological data are used as input data for the machine learning system. The memory 414 can also be usable for the ophthalmological training data.

It should be expressly pointed out that the modules and units—in particular the processor 402, the memory 404, the providing module 406 for storing the physical model, the calculation unit 408 for the physical model, the calculation unit 418 for the loss function, the training module 410, the machine learning system 412, the memory 416 for the ophthalmological data, and the prediction unit 416—can be connected to electrical signal lines or via a system-internal bus system 420 for the purpose of signal or data exchange. Additionally, a display unit can also be connected to the system-internal bus system 420 or the prediction unit 416 in order to output, display or otherwise further-process or forward the refractive power.

If a classification system is used as machine learning system, the predicted refractive power arises in accordance with the predicted class which is predicted with the greatest probability. Alternatively, the final refractive power of the IOL can also be implemented by means of a regression system as machine learning system with numerical output variables.

FIG. 5 illustrates a block diagram of a computer system which can comprise at least parts of the system for determining the refractive power. Embodiments of the concept proposed here can in principle be used together with virtually any type of computer, regardless of the platform used therein to store and/or execute program codes. FIG. 5 illustrates by way of example a computer system 500 that is suitable for executing program code according to the method presented here yet can also contain the prediction system in full or in part.

The computer system 500 has a plurality of general-purpose functions. The computer system can in this case be a tablet computer, a laptop/notebook computer, another portable or mobile electronic device, a microprocessor system, a microprocessor-based system, a smartphone, a computer system with specifically configured special functions or else a constituent part of a microscope system. The computer system 500 can be configured for executing computer system-executable instructions—such as for example program modules—that can be executed in order to implement functions of the concepts proposed here. For this purpose, the program modules can comprise routines, programs, objects, components, logic, data structures etc. in order to implement particular tasks or particular abstract data types.

The components of the computer system can comprise the following: one or more processors or processing units 502, a storage system 504 and a bus system 506 that connects various system components, including the storage system 504, to the processor 502. The computer system 500 typically comprises a plurality of volatile or non-volatile storage media accessible by the computer system 500. The storage system 504 can store the data and/or instructions (commands) of the storage media in volatile form—such as for example in a RAM (random access memory) 508—in order to be executed by the processor 502. These data and instructions realize one or more functions and/or steps of the concept presented here. Further components of the storage system 504 can be a permanent memory (ROM) 510 and a long-term memory 512 in which the program modules and data (reference sign 516) and also workflows can be stored.

The computer system comprises a number of dedicated devices (keyboard 518, mouse/pointing device (not illustrated), screen 520, etc.) for communication purposes. These dedicated devices can also be combined in a touch-sensitive display. An I/O controller 514, provided separately, ensures a frictionless exchange of data with external devices. A network adapter 522 is available for communication via a local or global network (LAN, WAN, for example via the Internet). The network adapter can be accessed by other components of the computer system 500 via the bus system 506. It is understood in this case, although it is not illustrated, that other devices can also be connected to the computer system 500.

Furthermore, at least parts of the system 400 for determining the refractive power of an IOL (cf. FIG. 4) can be connected to the bus system 506.

The description of the various exemplary embodiments of the present disclosure has been given for the purpose of improved understanding, but does not serve to directly restrict the inventive concept to these exemplary embodiments. A person skilled in the art will himself/herself develop further modifications and variations. The terminology used here has been selected so as to best describe the basic principles of the exemplary embodiments and to make them easily accessible to a person skilled in the art.

The principle presented here may be embodied as a system, as a method, combinations thereof and/or else as a computer program product. The computer program product can in this case comprise one (or more) computer-readable storage medium/media comprising computer-readable program instructions in order to cause a processor or a control system to implement various aspects of the present disclosure.

As media, electronic, magnetic, optical, electromagnetic or infrared media or semiconductor systems are used as forwarding medium; for example SSDs (solid state devices/drives as solid state memory), RANI (random access memory) and/or ROM (read-only memory), EEPROM (electrically erasable ROM) or any combination thereof. Suitable forwarding media also include propagating electromagnetic waves, electromagnetic waves in waveguides or other transmission media (for example light pulses in optical cables) or electrical signals transmitted in wires.

The computer-readable storage medium can be an embodying device that retains or stores instructions for use by an instruction executing device. The computer-readable program instructions that are described here can also be downloaded onto a corresponding computer system, for example as a (smartphone) app from a service provider via a cable-based connection or a mobile radio network.

The computer-readable program instructions for executing operations of the disclosure described here can be machine-dependent or machine-independent instructions, microcode, firmware, status-defining data or any source code or object code that is written for example in C++, Java or the like or in conventional procedural programming languages such as for example the programming language "C" or similar programming languages. The computer-readable program instructions can be executed in full by a computer system. In some exemplary embodiments, there may also be electronic circuits, such as, for example, programmable logic circuits, field-programmable gate arrays (FPGAs) or programmable logic arrays (PLAs), which execute the computer-readable program instructions by using status information of the computer-readable program instructions in order to configure or to individualize the electronic circuits according to aspects of the present disclosure.

The disclosure presented here is furthermore illustrated with reference to flowcharts and/or block diagrams of methods, devices (systems) and computer program products according to exemplary embodiments of the disclosure. It should be pointed out that practically any block of the flowcharts and/or block diagrams can be embodied as computer-readable program instructions.

The computer-readable program instructions can be made available to a general purpose computer, a special computer or a data processing system programmable in some other way, in order to produce a machine, such that the instructions that are executed by the processor or the computer or other programmable data processing devices generate means for implementing the functions or processes illustrated in the flowchart and/or block diagrams. These computer-readable program instructions can accordingly also be stored on a computer-readable storage medium.

In this sense any block in the illustrated flowchart or block diagrams can represent a module, a segment or portions of instructions representing a plurality of executable instructions for implementing the specific logic function. In some exemplary embodiments, the functions represented in the individual blocks can be implemented in a different order—optionally also in parallel.

The illustrated structures, materials, sequences and equivalents of all means and/or steps with associated functions in the claims hereinafter are intended to apply all structures, materials or sequences as expressed by the claims.

The invention claimed is:

1. A computer-implemented method for determining refractive power for an intraocular lens to be inserted, the method comprising providing a physical model for determining refractive power for an intraocular lens, training a machine learning system with measured clinical ophthalmological training data and associated desired results to form a learning model for determining the refractive power, wherein a loss function for the training comprises two components, and wherein:

a first component of the loss function takes into account corresponding items of the measured clinical ophthalmological training data and associated and desired results, and a second component of the loss function takes into account limitations of the physical model in that a loss function component value of this second component becomes all the greater, the further a predicted value of the refractive power during the training deviates from results of the physical model with the measured clinical ophthalmological training data as input values, providing measured ophthalmological data of a patient, and predicting the refractive power of the intraocular lens to be inserted by means of the trained machine learning system, wherein the measured ophthalmological data is used as input data for the machine learning system.

2. The method of claim 1, wherein the first and second components of the loss function are weightable in a configurable manner.

3. The method of claim 2, further comprising applying a weighting function ("$W_L$"), wherein the weighting function "$W_L$" is defined by the following equation:

$$W_L = B*[a*(\mathrm{Delta})-(1-a)*Phy], \text{ wherein}$$

$W_L$=value of the loss function,

B=general constant or further function term of the loss function, a=weighting constant, Delta=first components, and Phy=second component.

4. The method of claim 1, wherein the measured clinical ophthalmological training data comprises:

OCT image data; or explicit values derived from OCT image data or both OCT image data and values derived from OCT image data.

5. The method of claim 1, wherein an expected position of the intraocular lens to be inserted is used as additional input data for the machine learning system.

6. The method of claim 1, wherein the learning model of the machine learning system, before the training with the measured clinical ophthalmological training data, has already been trained using artificially generated training data based on laws of the physical model provided.

7. The method of claim 1, wherein the physical model also comprises literature data for determining refractive power for an intraocular lens.

8. The method of claim 1, wherein the intraocular lens to be inserted is a spherical, toric or multifocal intraocular lens to be inserted.

9. A system for determining refractive power for an intraocular lens to be inserted, the system comprising:

a providing module in which a physical model for determining refractive power for an intraocular lens is stored, a training module adapted for training a machine learning system with measured clinical ophthalmological training data and associated desired results to form a learning model for determining the refractive power, wherein parameter values of the learning model are stored in the learning system, wherein a loss function for the training comprises two components, and wherein:

a first component of the loss function takes into account corresponding items of the measured clinical ophthalmological training data and associated and desired results, and a second component of the loss function takes into account limitations of the physical model in that a loss function component value of this second component becomes all the greater, the further a predicted value of the refractive power during the training deviates from results of the physical model with the measured clinical ophthalmological training data as input values, a memory for measured ophthalmological data of a patient, and a prediction unit adapted for predicting the refractive power of the intraocular lens to be inserted by means of the trained machine learning system, wherein the measured ophthalmological data is used as input data for the trained machine learning system.

10. A non-transitory computer-readable storage medium storing program instructions, wherein the program instructions, when executed by one or more computers or control units, cause said one or more computers or control units to:

provide a physical model for determining refractive power for an intraocular lens, train a machine learning system with measured clinical ophthalmological training data and associated desired results to form a learning model for determining the refractive power, wherein a loss function for the training comprises two components, and wherein:

a first component of the loss function takes into account corresponding items of the measured clinical ophthalmological training data and associated and desired results, and a second component of the loss function takes into account limitations of the physical model in that a loss function component value of this second component becomes all the greater, the further a predicted value of the refractive power during the training deviates from results of the physical model with the clinical ophthalmological training data as input values, provide measured ophthalmological data of a patient, and predict the refractive power of the intraocular lens to be inserted by means of the trained machine learning system, wherein the measured ophthalmological data are used as input data for the machine learning system.

11. The non-transitory computer-readable storage medium of claim 10, wherein the first and second components of the loss function are weightable in a configurable manner.

12. The non-transitory computer-readable storage medium of claim 11, wherein the program instructions also cause the one or more computers or control units to apply a weighting function ("$W_L$"), wherein the weighting function "$W_L$" is defined by the following equation:

$$W_L = B*[a*(\text{Delta})-(1-a)*Phy], \text{ wherein}$$

$W_L$=value of the loss function,

B=general constant or further function term of the loss function, a=weighting constant, Delta=first component, and Phy=second component.

13. The non-transitory computer-readable storage medium of claim 10, wherein the measured clinical ophthalmological training data comprises:

OCT image data;

explicit values derived from OCT image data; or both OCT image data and values derived from OCT image data.

14. The non-transitory computer-readable storage medium of claim 10, wherein an expected position of the intraocular lens to be inserted is used as additional input data for the machine learning system.

15. The non-transitory computer-readable storage medium of claim 10, wherein the learning model of the machine learning system, before the training with the measured clinical ophthalmological training data, has already been trained using artificially generated training data based on laws of the physical model.

16. The non-transitory computer-readable storage medium of claim 10, wherein the physical model also comprises literature data for determining refractive power for an intraocular lens.

17. The non-transitory computer-readable storage medium of claim 10, wherein the intraocular lens to be inserted is a spherical, toric or multifocal intraocular lens to be inserted.

* * * * *